(12) United States Patent
Tsuji

(10) Patent No.: US 9,568,651 B2
(45) Date of Patent: Feb. 14, 2017

(54) VIEW ANGLE-RESTRICTING SHEET AND FLAT PANEL DISPLAY

(71) Applicant: KEIWA INC., Osaka (JP)

(72) Inventor: Takahiro Tsuji, Osaka (JP)

(73) Assignee: Keiwa Inc., Osaka (JP)

( * ) Notice: Subject to any disclaimer, the term of this patent is extended or adjusted under 35 U.S.C. 154(b) by 174 days.

(21) Appl. No.: 14/388,387

(22) PCT Filed: Mar. 27, 2013

(86) PCT No.: PCT/JP2013/059089
§ 371 (c)(1),
(2) Date: Sep. 26, 2014

(87) PCT Pub. No.: WO2013/146921
PCT Pub. Date: Oct. 3, 2013

(65) Prior Publication Data
US 2015/0049388 A1    Feb. 19, 2015

(30) Foreign Application Priority Data

Mar. 27, 2012 (JP) .................. 2012-071869
Mar. 26, 2013 (JP) .................. 2013-063828

(51) Int. Cl.
G02B 5/02    (2006.01)

(52) U.S. Cl.
CPC ........... *G02B 5/0236* (2013.01); *G02B 5/0242* (2013.01); *G02B 5/0278* (2013.01)

(58) Field of Classification Search
CPC .... G02B 5/0236; G02B 5/0242; G02B 5/0278
(Continued)

(56) References Cited

U.S. PATENT DOCUMENTS 6,937,399 B2    8/2005    Takahashi et al.
7,551,239 B2    6/2009    Fukushima et al.
(Continued)

FOREIGN PATENT DOCUMENTS

CN    1463368    12/2003
CN    1651981    8/2005
(Continued)

*Primary Examiner* — Bumsuk Won
*Assistant Examiner* — Grant Gagnon
(74) *Attorney, Agent, or Firm* — Norris McLaughlin & Marcus, P.A.

(57) ABSTRACT

The view angle-restricting sheet according to the present invention includes an optically functional layer which includes: a plurality of first light transmission sections that are rectangular in cross section and arranged in a multi-stripe fashion; and at least one second light transmission section that is/are rectangular in cross section and arranged between the first light transmission sections, at least one of the lateral face of the first light transmission section and the lateral face of the second light transmission section that face each other being provided as a light-scattering surface having a microstructure including fine protrusions. The arithmetic mean roughness (Ra) of the light-scattering surface is preferably no less than 1.5 μm and no greater than 4 μm. The ratio (Rz/Ra) of the ten-point mean roughness (Rz) to the arithmetic mean roughness (Ra) of the light-scattering surface is preferably no less than 1 and no greater than 20.

14 Claims, 5 Drawing Sheets

(58) Field of Classification Search
USPC .......................................................... 359/599
See application file for complete search history.

(56) References Cited

U.S. PATENT DOCUMENTS

| | | | |
|---|---|---|---|
| 2004/0047042 A1 | 3/2004 | Takahashi et al. | |
| 2005/0063062 A1* | 3/2005 | Ito | G02B 5/0226 |
| | | | 359/599 |
| 2005/0174529 A1 | 8/2005 | Fukushima et al. | |
| 2005/0243428 A1 | 11/2005 | Takahashi et al. | |
| 2008/0186558 A1* | 8/2008 | Lee | G02B 6/04 |
| | | | 359/227 |
| 2009/0268273 A1* | 10/2009 | Powers | G02B 5/0231 |
| | | | 359/288 |
| 2010/0165460 A1* | 7/2010 | Furui | G02B 1/105 |
| | | | 359/488.01 |
| 2011/0080645 A1* | 4/2011 | Tsuno | G02B 5/0294 |
| | | | 359/599 |

FOREIGN PATENT DOCUMENTS

| | | |
|---|---|---|
| CN | 101793378 | 8/2010 |
| EP | 1 369 711 | 3/2002 |
| EP | 1 369 711 | 12/2003 |
| JP | 2007-272065 | 10/2007 |
| JP | 2009-25472 | 2/2009 |
| JP | 2010-176014 | 8/2010 |
| JP | 2010-223996 | 10/2010 |
| JP | 2010-237344 | 10/2010 |
| KR | 2003-0004401 | 1/2003 |
| TW | 201030383 | 8/2010 |
| TW | 201207439 | 2/2012 |

* cited by examiner

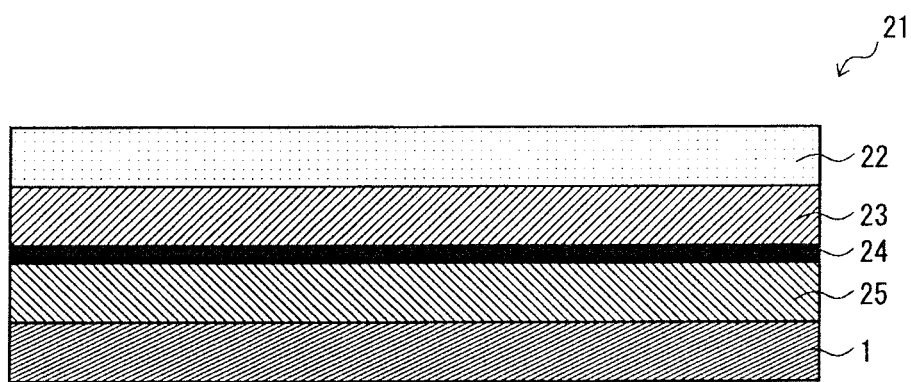
F I G. 4

VIEW ANGLE-RESTRICTING SHEET AND FLAT PANEL DISPLAY

TECHNICAL FIELD

The present invention relates to a view angle-restricting sheet and a flat panel display.

BACKGROUND ART

Flat panel displays are intensively used as information display devices such as mobile phones, personal digital assistances (PDAs), personal computers, televisions, and the like.

As far as the mobile phones and the personal digital assistances are concerned, for example, the flat panel displays provide advantages that: they enable necessary information to be obtained wherever the information is desired; and the like. However, in some places, an image displayed on the mobile phones or the personal digital assistances is highly likely to be subjected to peeking by person(s) around a user, which causes an issue of privacy such as leakage of personal information.

In addition, some flat panel displays include a touchscreen in order to improve ease of operation for users, speedy operability, and the like. Such flat panel displays that include the touchscreen are employed in ATMs (automated teller machines) installed in banks, for example; however, if a security code or personal information is subjected to peeking by person(s) around a user when the user inputs the security code or personal information through the touchscreen, such information may be used for improper purposes.

In view of such problems, in these days, a view angle-restricting sheet has been proposed that can prevent peeking by person(s) around a user by restricting a view angle (see Japanese Unexamined Patent Application, Publication No. 2010-223996).

The view angle-restricting sheet (which may be referred to as "view angle-controlling optical sheet") includes a first region that yields a narrow view angle on a display screen, and a second region that yields a wide view angle on the display screen. The view angle-controlling optical sheet is characterized in that the first region is formed by alternately arranging: light transmission sections that contain an optically transparent material; and light-absorbing sections that contain a light-absorbing material. The view angle-controlling optical sheet can extract rays of light rays of light having an incident angle falling within a certain range of angle, predominantly including those perpendicularly oriented, and absorb rays of light obliquely oriented on the light-absorbing section, and therefore the peeking by the person(s) around the user from the oblique direction can be prevented. However, in the view angle-controlling optical sheet, the light-absorbing sections are arranged at a constant interval, and therefore the view angle-controlling optical sheet has a disadvantage that a reduction in front face luminance is likely to be caused.

PRIOR ART DOCUMENTS

Patent Documents

Patent Document 1: Japanese Unexamined Patent Application, Publication No. 2010-223996

SUMMARY OF THE INVENTION

Problems to be Solved by the Invention

The present invention was made in view of the foregoing circumstances, and an object of the present invention is to provide: a view angle-restricting sheet capable of suitably preventing leakage of personal information and the like through glimmering from an oblique direction and capable of inhibiting a reduction in front face luminance; and a flat panel display that includes the view angle-restricting sheet.

Means for Solving the Problems

According to an aspect of the invention made for solving the aforementioned problems, a view angle-restricting sheet is provided, including an optically functional layer which includes: a plurality of first light transmission sections that are rectangular in cross section and arranged in a multi-stripe fashion; and at least one second light transmission section that is/are rectangular in cross section and arranged between the first light transmission sections, at least one of the lateral face of the first light transmission section and the lateral face of the second light transmission section that face each other being provided as a light-scattering surface having a microstructure including fine protrusions.

Since the view angle-restricting sheet includes the first light transmission sections, and the at least one second light transmission section arranged between the first light transmission sections, and at least one of the lateral face of the first light transmission section and the lateral face of the second light transmission section that face each other is/are provided as a light-scattering surface, rays of light entering from the back face side at a predetermined angle are allowed to exit after being diffused by the light-scattering surface. On the other hand, the view angle-restricting sheet allows the rays of light entering from the back face side substantially perpendicularly to the first light transmission section or the second light transmission section to substantially perpendicularly exit from the front face side of the optically functional layer. Therefore, the view angle-restricting sheet can serve to display a sharp image to a person seeing from the front direction (user), and can prevent the leakage of personal information and the like to a person seeing from the oblique direction by blurring the image displayed. The view angle-restricting sheet prevents the leakage of personal information and the like by diffusing, on the light-scattering surface, rays of light entering from the back face side at a predetermined angle; therefore, a reduction in front face luminance can be inhibited According to the view angle-restricting sheet, an arithmetic mean roughness (Ra) of the light-scattering surface is preferably no less than 1.5 µm and no greater than 4 µm. Thus, rays of light can be suitably diffused by the light-scattering surface.

According to the view angle-restricting sheet, the ratio (Rz/Ra) of a ten-point mean roughness (Rz) to the arithmetic mean roughness (Ra) of the light-scattering surface is preferably no less than 1 and no greater than 20. Thus, the nonuniformity of the microstructure including fine protrusions may be reduced, leading to an improvement of light-diffusing ability.

According to the view angle-restricting sheet, no less than 2 pieces/mm and no greater than 100 pieces/mm of the light-scattering surface are previewed per unit length along a perpendicular direction of the light-scattering surface. Thus, the view angle can be suitably adjusted, and the leakage of personal information and the like through glimmering from an oblique direction can be suitably prevented.

According to the view angle-restricting sheet, the haze value of at least one of the first light transmission section and the second light transmission section is no greater than 20%, and the ratio (T/W) of the thickness (T) to the width (W) of the light transmission section having the haze value of no greater than 20% is preferably no less than 1 and no greater than 8.5. Thus, the front face luminance can be improved using the rays of light passing through the light transmission section having such a haze value, and the view angle can be suitably adjusted.

According to the view angle-restricting sheet, it is preferred that a refractive index ($n_1$) of the first light transmission section differs from a refractive index ($n_2$) of the second light transmission section. Thus, rays of light can be suitably diffused by the light-scattering surface.

According to the view angle-restricting sheet, an absolute value of a difference ($|n_1-n_2|$) between the refractive index ($n_1$) of the first light transmission section and the refractive index ($n_2$) of the second light transmission section is preferably no less than 0.15. Thus, rays of light can be further suitably diffused by the light-scattering surface.

According to the view angle-restricting sheet, the lateral face of the first light transmission section and the lateral face of the second light transmission section are preferably in close contact with each other. Thus, the sharpness of an image seen from the front direction and the degree of blurring of the image seen from the oblique direction may be suitably controlled.

According to the view angle-restricting sheet, it is preferred that the first light transmission section contains a light diffusing agent and a resin matrix. Thus, the light-diffusing ability of the first light transmission section can be remarkably improved.

According to the view angle-restricting sheet, it is preferred that the first light transmission section contains a light diffusing agent and a resin matrix, and that the ratio ($W_2/W_1$) of the width ($W_2$) of the second light transmission section to the width ($W_1$) of the first light transmission section is no less than 1.5 and no greater than 15. Thus, a sharp image can be displayed to the person seeing from the front direction, and the leakage of personal information and the like through glimmering from the oblique direction can be suitably prevented.

According to the view angle-restricting sheet, it is preferred that first light transmission section contains a light diffusing agent and a resin matrix, and that the ratio ($T_1/W_1$) of the thickness ($T_1$) to the width ($W_1$) of the first light transmission section is no less than 4 and no greater than 40. Thus, a sharp image can be displayed to the person seeing from the front direction, and the leakage of personal information and the like through glimmering from the oblique direction can be suitably prevented.

According to the view angle-restricting sheet, it is preferred that the first light transmission section contains a light diffusing agent and a resin matrix, and that a distance between the first light transmission sections arranged is no less than 6 μm and no greater than 400 μm. Thus, a sharp image can be displayed to the person seeing from the front direction, and the leakage of personal information and the like through glimmering from the oblique direction can be suitably prevented.

According to the view angle-restricting sheet, it is preferred that a refractive index ($n_5$) of the resin matrix of the first light transmission section is greater than the refractive index ($n_2$) of the second light transmission section. Thus, the sharpness of the image displayed to the person seeing from the front direction can be improved.

According to the view angle-restricting sheet, the front face of the optically functional layer is preferably entirely flat. Thus, outgoing rays of light can be easily controlled. In addition, according to the view angle-restricting sheet, a constant thickness of the optically functional layer can be maintained, and ease of use and optical uniformity thereof can be improved.

According to the view angle-restricting sheet, a back face of the optically functional layer is preferably entirely flat. Thus, incident rays of light can be easily controlled. In addition, according to the view angle-restricting sheet, a constant thickness of the optically functional layer can foe maintained, and ease of use and optical uniformity thereof can be improved.

The view angle-restricting sheet preferably includes a protective layer provided on one face side of the optically functional layer. Thus, the strength, the shape stability and the like can be improved.

The view angle-restricting sheet is preferably provided on a front face side of a display panel of a flat panel display. Thus, a sharp image can foe displayed to the person seeing from the front direction, and the leakage of personal information and the like through glimmering from an oblique direction can be suitably prevented.

Moreover, according to another aspect of the invention made for solving the aforementioned problems, a flat panel display is provided, including the view angle-restricting sheet according to the aspect of the present invention.

According to the flat panel display, the rays of light entering from the back face side of the view angle-restricting sheet at a predetermined angle are allowed to exit after being diffused by the light-scattering surface. On the other hand, the flat panel display allows the rays of light entering from the back face side of the view angle-restricting sheet substantially perpendicularly to the first light transmission section or the second light transmission section to substantially perpendicularly exit from the front face side of the optically functional layer. Therefore, the flat panel display can display a sharp image to a person seeing from the front direction (user), and can prevent the leakage of personal information and the like to a person seeing from the oblique direction by blurring the image displayed.

It is to be noted that the term "arithmetic mean roughness (Ra)" and "ten-point mean roughness (Rz)" used herein are determined in accordance with JIS B0601-2001. The terms "width" and "distance" mean an average length along a direction perpendicular to a longitudinal direction and perpendicular to a thickness direction of the sheet. Moreover, the term "thickness" means an average thickness measured in accordance with JIS K7130. The term "haze value" means a value measured in accordance with JIS K7105. The term "front face side" means a side of a flat panel display on which a person seeing at the flat panel display exists, and the term "back face side" means an opposite side thereof.

Effects of the Invention

As explained in the foregoing, the view angle-restricting sheet according to the aspects of the present invention and tine flat panel display including the view angle-restricting sheet enable the leakage of personal information and the like through glimmering from the oblique direction to be suitably prevented and a reduction in front face luminance to be inhibited.

BRIEF DESCRIPTION OF THE DRAWINGS

FIG. 4 is a schematic cross sectional view illustrating a touchscreen according to an embodiment of the present invention.

DESCRIPTION OF EMBODIMENTS

First Embodiment
View Angle-Restricting Sheet 1

Hereinafter, preferred modes for carrying out the present invention will be explained in more detail with reference to the drawings, if necessary.

Figure 1:
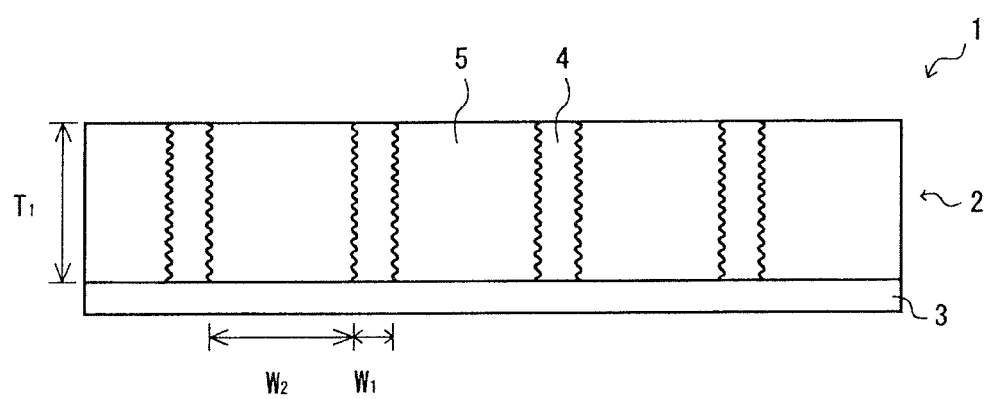
FIG. 1 is a schematic cross sectional view illustrating a view angle-restricting sheet according to an embodiment of the present invention.

A view angle-restricting sheet 1 shown in FIG. 1 includes an optically functional layer 2 and a protective layer 3.

Optically Functional Layer 2

The optically functional layer 2 includes: a plurality of first light transmission sections 4 that are rectangular in cross section and arranged in a multi-stripe fashion; and a plurality of second light transmission sections 5 that are rectangular in cross section and arranged in a multi-stripe fashion. In the optically functional layer 2, the first light transmission sections 4 are arranged substantially parallel to each other at intervals, and the second light transmission sections 5 are arranged between the first light transmission sections 4. The optically functional layer 2 is configured such that the width ($W_1$) of the first light transmission section 4 is less than the width ($W_2$) of the second light transmission section 5. The front face and the back face of the optically functional layer 2 are formed to be entirely flat. The optically functional layer 2 is configured such that a lateral face of the first light transmission section 4 and a lateral face of the second light transmission section 5 are in close contact with each other.

Although the thickness of the optically functional layer 2 is not particularly limited, the thickness of the optically functional layer 2 is preferably no less than 50 μm and no greater than 400 μm. The upper limit value of the thickness of the optically functional layer 2 is more preferably 300 μm, and still more preferably 200 μm. On the other hand, the lower limit value of the thickness of the optically functional layer 2 is more preferably 100 μm, and still more preferably 150 μm. When the thickness of the optically functional layer 2 is greater than the upper limit value, the optical transparency may be deteriorated, and it may be difficult to satisfy a requirement of a reduction in thickness of the view angle-restricting sheet 1. To the contrary, when the thickness of the optically functional layer 2 is less than the lower limit value, controllability over the rays of light entering from the back face side is highly likely to be impaired.

First Light Transmission Section 4

The first light transmission section 4 contains a transparent, in particular, colorless and transparent, synthetic resin as a principal component, since the first light transmission section 4 needs to transmit rays of light. Although the synthetic resin as a principal component of the first light transmission section 4 is not particularly limited, a thermoplastic resin may be suitably used. Examples of the thermoplastic resin for use as a principal component of the first light transmission section 4 include polyethylene terephthalate, polyethylene naphthalate, acrylic resins, polycarbonates, polystyrenes, polyolefins, cellulose acetate and weather resistant vinyl chlorides. Of these, as the principal component of the first light transmission section 4, polyethylene terephthalate and polycarbonates are preferred, in light of superior transparency and strength, as well as ease of controlling birefringence thereof, and polyethylene terephthalate that exhibits an improved deflectional performance is particularly preferred.

An active energy ray-curable resin may also be used as the principal component of the first light transmission section 4. When the active energy ray-curable resin is used as the principal component of the first light transmission section 4, predetermined shape accuracy can be easily attained, and in addition, the physical strength may be enhanced to improve the scratch-inhibitory ability, leading to the prevention of the alteration of the optical characteristics. The active energy ray-curable resin for suitable use as the principal component of the first light transmission section 4 is exemplified by an ultraviolet ray-curable resin.

Examples of the ultraviolet ray-curable resin include ultraviolet ray-curable urethane acrylate resins, ultraviolet ray-curable polyester acrylate resins, ultraviolet ray-curable epoxy acrylate resins, ultraviolet ray-curable polyol acrylate resins and ultraviolet ray-curable epoxy resins, and among these, ultraviolet ray-curable acrylate resins are preferred.

When the principal component of the first light transmission section 4 is an ultraviolet ray-curable resin, a photoinitiator is preferably used in combination. Examples of the photoinitiator include benzoin and derivatives thereof, acetophenone, benzophenone, hydroxybenzophenone, Michler's ketone, α-amyloxime ester, thiaxanthon, and the like as well as derivatives thereof.

Although the content of the photoinitiator is not particularly limited, the content of the photoinitiator with respect to the ultraviolet ray-curable resin is preferably no less than 1% by mass and no greater than 10% by mass, and more preferably no less than 3% by mass and no greater than 6% by mass. When the content of the photoinitiator is greater than the upper limit, a degree of polymerization of the ultraviolet ray-curable resin may be decreased. To the contrary, when the content of the photoinitiator is less than the lower limit, the curing reaction may not proceed sufficiently.

It is to be noted that an additive such as a curing agent, a plasticizer, a dispersant, various types of levelling agents, an ultraviolet ray-absorbing agent, an antioxidant, a viscosity modifier, a lubricant and a light stabilizer may be appropriately blended into the first light transmission section 4, as needed.

In the first light transmission section 4, a lateral face that faces the second light transmission section 5 is provided as a light-scattering surface having a microstructure including fine protrusions. The microstructure including fine protrusions provided in the first light transmission section 4 is provided on the entire lateral face of the first light transmission section 4 that faces the second light transmission section 5. Although the arithmetic mean roughness (Ra) of the light-scattering surface of the first light transmission section 4 that faces the second light transmission section 5 is not particularly limited, this arithmetic mean roughness (Ra) is preferably no less than 1.5 μm and no greater than 4

µm. The upper limit value of the arithmetic mean roughness (Ra) of the light-scattering surface of the first light transmission section 4 that faces the second light transmission section 5 is more preferably 3.8 µm, and still more preferably 3.5 µm. On the other hand, the lower limit value of the arithmetic mean roughness (Ra) of the light-scattering surface or the first light transmission section 4 that faces the second light transmission section 5 is more preferably 1.7 µm, and still more preferably 2 µm. When the arithmetic mean roughness (Ra) of the light-scattering surface is greater than the upper limit value, it is highly likely to be difficult to allow uniformly diffused rays of light to exit. To the contrary, when the arithmetic mean roughness (Ra) of the light-scattering surface is less than the lower limit value, the diffusibility of the rays of light is highly Likely to be impaired. To the contrary, in the relationship with a wavelength of visible light (360 nm to 750 nm), when the light-scattering surface of the first light transmission section 4 includes a microstructure including fine protrusions that are several times greater in size than the wavelength, the rays of light can be effectively diffused at a boundary having the microstructure including fine protrusions. In particular, the effect of diffusing rays of light may be exhibited very remarkably at a boundary having a microstructure including fine protrusions that are about five-times greater than the wavelength.

Although the ten-point mean roughness (Rz) of the light-scattering surface of the first light transmission section 4 that faces the second light transmission section 5 is not particularly limited, this ten-point mean roughness (Rz) is preferably no less than 1.0 µm and no greater than 40 µm. The upper limit value of the ten-point mean roughness (Rz) of the light-scattering surface of the first light transmission section 4 that faces the second light transmission section 5 is more preferably 35 µm, and still more preferably 30 µm. On the other hand, the lower limit value of the ten-point mean roughness (Rz) of the light-scattering surface of the first light transmission section 4 that faces the second light transmission section 1 is more preferably 1.7 µm, and still more preferably 2 µm. When the ten-point mean roughness (Rz) of the light-scattering surface is greater than the upper limit value, it is highly likely to be difficult to allow uniformly diffused rays of light to exit. To the contrary, when the ten-point mean roughness (Rz) of the light-scattering surface is less than the lower limit value, the diffusibility of the rays of light is highly likely to be impaired.

Although the ratio (Rz/Ra) of the ten-point mean roughness (Rz) to the arithmetic mean roughness (Ra) of the light-scattering surface of the first light transmission section 4 that faces the second light transmission section 5 is not particularly limited, the ratio (Rz/Ra) is preferably no less than 1 and no greater than 20. The upper limit of the ratio (Rz/Ra) of the ten-point mean roughness (Rz) to the arithmetic mean roughness (Ra) of the light-scattering surface of the first light transmission section 4 that faces the second light transmission section 5 is more preferably 15, and still more preferably 10. When the ratio (Rz/Ra) of the ten-point mean roughness (Rz) to the arithmetic mean roughness (Ra) of the light-scattering surface is greater than the upper limit, the nonuniformity of the microstructure including fine protrusions is increased, and consequently a suitable diffusion distribution is highly unlikely to be attained. To the contrary, according to the view angle-restricting sheet 1, when the ten-point mean roughness (Rz) of the light-scattering surface of the first light transmission section 4 that faces the second light transmission section 5 is limited within the aforementioned range with respect to the arithmetic mean roughness (Ra), the nonuniformity of the microstructure including fine protrusions may be reduced, leading to an improvement of light-diffusing ability.

The average pitch of the protruding parts of the microstructure including fine protrusions of the first light transmission section 4 is preferably no less than 500 nm and no greater than 5 µm, and more preferably no less than 1 µm and no greater than 3 µm. When the average pitch of the protruding parts does not fall within the range, a sufficient light diffusion function is highly unlikely to be exhibited.

Although the thickness ($T_1$) of the first light transmission section 4 is not particularly limited, the thickness ($T_1$) may be identical to the thickness of the optically functional layer 2, in general.

Second Light Transmission Section 5

The second light transmission section 5 contains a transparent, in particular, colorless and transparent, synthetic resin as a principal component, since the second light transmission section 5 needs to transmit rays of light. Although the synthetic resin as a principal component of the second light transmission section 5 is not particularly limited, examples thereof include synthetic resins similar to those used as the principal component of the first light transmission section 4. Additives which may be blended into the second light transmission section 5 may be identical to those which may be blended into the first light transmission section 4.

In the second light transmission section 5, a lateral face that faces the first light transmission section 4 is provided as a light-scattering surface having a microstructure including fine protrusions. The microstructure including fine protrusions provided in the second light transmission section 5 is provided on the entire lateral face of the second light transmission section a that faces the first light transmission section 4. Although the arithmetic mean roughness (Ra) of the light-scattering surface of the second light transmission section 5 that faces the first light transmission section 4 is not particularly limited, the arithmetic mean roughness (Ra) of the light-scattering surface of the second light transmission section 5 that faces the first light transmission section 4 is preferably no less than 1.5 µm and no greater than 4 µm. The upper limit value of the arithmetic mean roughness (Ra) of the light-scattering surface of the second light transmission section 5 that faces the first light transmission section 4 is more preferably 3.8 µm, and still more preferably 3.5 µm. On the other hand, the lower limit value of the arithmetic mean roughness (Ra) of the light-scattering surface of the second light transmission section 5 that faces the first light transmission section 4 is more preferably 1.7 µm, and still more preferably 2 µm. When an arithmetic mean roughness (Ra) of the light-scattering surface is greater than the upper limit value, it is highly likely to be difficult to allow uniformly diffused rays of light to exit. To the contrary, when the arithmetic mean roughness (Ra) of the light-scattering surface is less than the lower limit value, the diffusibility of the rays of light is highly likely to be impaired. To the contrary, in the relationship with a wavelength of visible light (360 nm to 750 nm), when the light-scattering surface of the second light transmission section 5 includes a microstructure including fine protrusions that are several times greater in size than the wavelength, the rays of light can be effectively diffused at a boundary having the microstructure including fine protrusions. In particular, the effect of diffusing rays of light may be exhibited very remarkably at a boundary having a microstructure including fine protrusions that are about five-times greater than the wavelength.

Although the ten-point mean roughness (Rz) of the light-scattering surface of the second light transmission section 5 that faces the first light transmission section 4 is not particularly limited, the ten-point mean roughness (Rz) of the light-scattering surface of the second light transmission section 5 that faces the first light transmission section 4 is preferably no less than 1.5 μm and no greater than 40 μm. The upper limit value of the ten-point mean roughness (Rz) of the light-scattering surface of the second light transmission section 5 that faces the first light transmission section 4 is more preferably 35 μm, and still more preferably 30 μm. On the other hand, the lower limit value of the ten-point mean roughness (Rz) of the light-scattering surface of the second light transmission section 3 that faces the first light transmission section 4 is more preferably 1.7 μm, and still more preferably 2 μm. When the ten-point mean roughness (Rz) of the light-scattering surface is greater than the upper limit valise, it is highly likely to be difficult to allow uniformly diffused rays of light to exit. To the contrary, when the ten-point mean roughness (Rz) of the light-scattering surface is less than the lower limit value, the diffusibility of the rays of light is highly likely to be impaired.

Although the ratio (Rz/Ra) of the ten-point mean roughness (Rz) to the arithmetic mean roughness (Ra) of the light-scattering surface of the second light transmission section 5 that faces the first light transmission section 4 is not particularly limited, the ratio (Rz/Ra) is preferably no less than 1 and no greater than 20. The upper limit of the ratio (Rz/Ra) of the ten-point mean roughness (Rz) to the arithmetic mean roughness (Ra) of the light-scattering surface of the second light transmission section 5 that faces the first light transmission section 4 is more preferably 15, and still more preferably 10. When the ratio (Rz/Ra) of the ten-point mean roughness (Rz) to the arithmetic mean roughness (Ra) of the light-scattering surface of the second light transmission section 5 that races the first light transmission section 4 is greater than the upper limit, the nonuniformity of the microstructure including fine protrusions may be increased, and consequently a suitable diffusion distribution is highly unlikely to be attained. To the contrary, according to the view angle-restricting sheet 1, when the ten-point mean roughness (Rz) of the light-scattering surface is limited within the aforementioned range with respect to the arithmetic mean roughness (Ra), the nonuniformity of the microstructure including fine protrusions may be reduced, leading to an improvement of light-diffusing ability.

The average pitch of the protruding parts of the microstructure including fine protrusions of the second light transmission section 5 is preferably no less than 500 nm and no greater than 5 μm, and more preferably no less than 1 μm and no greater than 3 μm. When the average pitch of the protruding parts does not fall within the range, a sufficient light diffusion function is highly unlikely to be exhibited.

Although the number of the light-scattering surfaces provided on a lateral face of the first light transmission sections 4 and the second light transmission section 5 is not particularly limited, the number of the light-scattering surfaces per unit length along the perpendicular direction of the light-scattering surface is preferably no less than 2 per mm and no greater than 100 per mm. The upper limit of the number of the light-scattering surfaces is more preferably 75 per mm, and still more preferably 50 per mm. On the other hand, the lower limit of the number of the light-scattering surfaces is more preferably 10 per mm, and still more preferably 20 per mm. When the number of the light-scattering surfaces is greater than the upper limit, the view angle may be decreased and the amount of the rays of light diffused by the light-scattering surface may be increased, and consequently the sharpness of an image displayed to the person seeing from the front direction is highly likely to be impaired. To the contrary, when the number of the light-scattering surfaces is less than the lower limit, the view angle may be increased, and the leakage of personal information and the like through glimmering from the oblique direction is highly unlikely to be suitably prevented. In regard to the number of the light-scattering surfaces used herein, it is to be noted that when the lateral face of the first light transmission section 4 and the lateral face of the second light transmission section 5 that face each other are both provided as the light-scattering surface, they shall be counted as one light-scattering surface.

Although the thickness ($T_2$) of the second light transmission section 5 is not particularly limited, the thickness ($T_2$) of the second light transmission section 5 may be identical to the thickness of the optically functional layer 2, in general.

Although the haze value of the second light transmission section 5 is not particularly limited, the haze value of the second light transmission section 5 is preferably no greater than 20%, more preferably no greater than 15%, and still more preferably no greater than 10%. When the haze value of the second light transmission section 5 is greater than the upper limit, it is highly likely that the light transmittance is decreased and consequently the front face luminance is reduced.

Moreover, although the ratio ($T_2/W_2$) of the thickness ($T_2$) to the width ($W_2$) of the second light transmission section 5 is nor particularly limited, the ratio ($T_2/W_2$) of the thickness ($T_2$) to the width ($W_2$) of the second light transmission section 5 is preferably no less than 1 and no greater than 8.5. The upper limit of the ratio ($T_2/W_2$) of the thickness ($T_2$) to the width ($W_2$) of the second light transmission section 5 is more preferably 5, and still more preferably 4. On the other hand, the lower limit of the ratio ($T_2/W_2$) of the thickness ($T_2$) to the width ($W_2$) of the second light transmission section 5 is more preferably 1.5, and still more preferably 2. When the thickness ratio ($T_2/W_2$) is greater than the upper limit, the amount of the rays of light exiting from the front face side of the second light transmission section 5 may be reduced, and the rays of light diffused by the light-scattering surface may be increased, leading to deterioration of the sharpness of an image when the image is seen from the front direction. To the contrary, when the thickness ratio ($T_2/W_2$) is less than the lower limit, the view angle may be excessively increased, and the leakage of personal information and the like to a person seeing from the oblique direction is highly likely to be caused.

It is preferred that the refractive index ($n_2$) of the second light transmission section 5 differs from a refractive index ($n_1$) of the first light transmission section 4. Thus, rays of light can be suitably diffused by the light-scattering surface.

Moreover, although an absolute value of the difference ($|n_1-n_2|$) between the refractive index ($n_1$) of the first light transmission section 4 and the refractive index ($n_2$) of the second light transmission section 5 is not particularly limited, the absolute value of the difference ($|n_1-n_2|$) is preferably no less than 0.15, more preferably no less than 0.3, and still more preferably no less than 0.45. When the absolute value of the difference between the refractive index ($n_1$) of the first light transmission section 4 and the refractive index ($n_2$) of the second light transmission section 5 ($|n_1 - n_2|$) is less than the lower limit, the diffusibility of the rays of light may be deteriorated.

Protective Layer 3

The protective layer 3 is provided on the back face of the optically functional layer 2. The protective layer 3 is contains a transparent, in particular, colorless and transparent, synthetic resin as a principal component, since the protective layer 3 needs to transmit rays of light. Although the synthetic resin as a principal component of the protective layer 3 is not particularly limited, examples thereof include synthetic resins similar to those used as the principal component of the second light transmission section 5. In addition, additives similar to those used for the second light transmission section 5 may be added to the protective layer 3.

Although the thickness of the protective layer 3 is not particularly limited, the thickness of the protective layer 3 is preferably no less than 1 μm and no greater than 10 μm. The upper limit value of the thickness of the protective layer 3 is more preferably 8 μm, and still more preferably 6 μm. On the other hand, the lower limit value of the thickness of the protective layer 3 is more preferably 2 μm, and still more preferably 3 μm. When the thickness of the protective layer 3 is greater than the upper limit value, it is highly likely to be difficult to satisfy a requirement of a reduction in thickness of the view angle-restricting sheet 1. To the contrary, when the thickness of the protective layer 3 is less than the lower limit value, the strength of the view angle-restricting sheet 1 is highly unlikely to be able to be suitably increased.

Although the refractive index ($n_4$) of the protective layer 3 is not particularly limited, the refractive index ($n_4$) of the protective layer 3 is preferably identical to the refractive index ($n_2$) of the second light transmission section. According to the view angle-restricting sheet 1, when the refractive index ($n_4$) of the protective layer 3 is identical to the refractive index ($n_2$) of the second light transmission section, a loss of the rays of light may be inhibited and consequently the front face luminance may be improved.

Mechanism of Diffusion of Rays of Light

Figure 2:
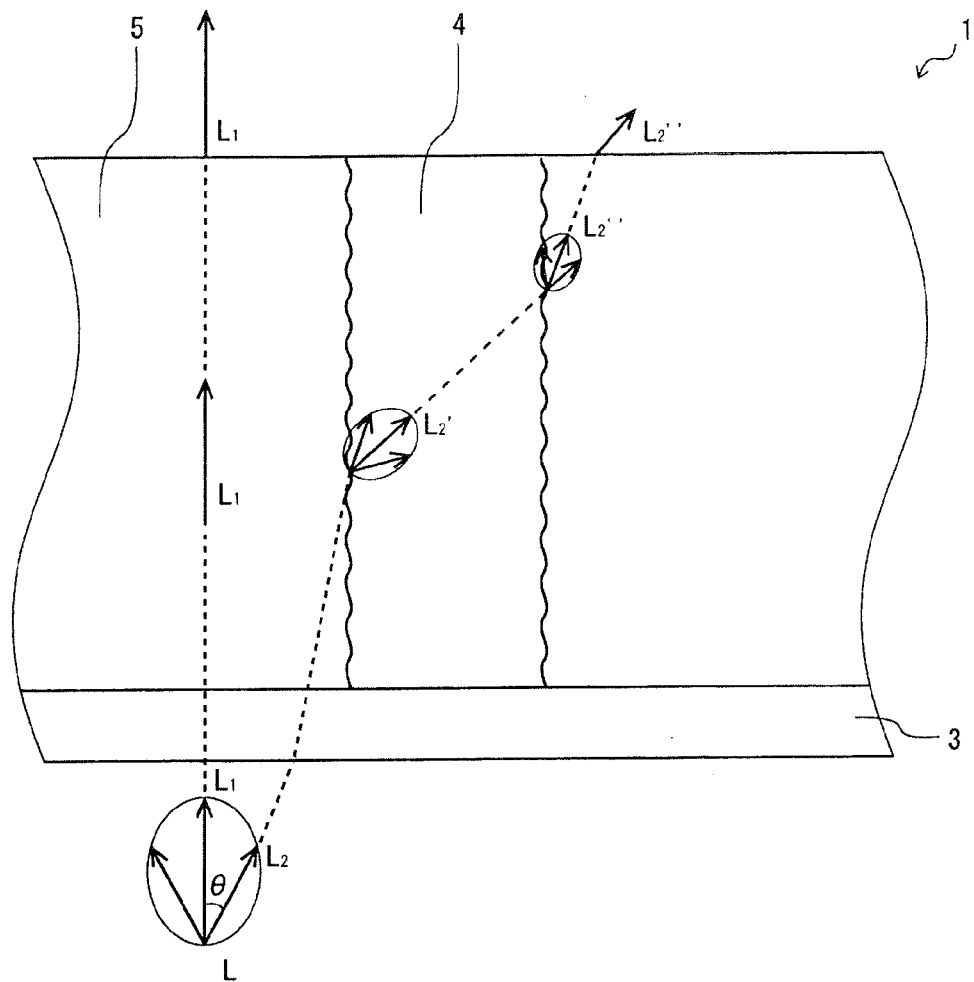
FIG. 2 is a diagram illustrating a mechanism of the diffusion of rays of light entering the view angle-restricting sheet shown in FIG. 1 from the back face side.

Next, referring to FIG. 2, a mechanism of the diffusion of the rays of light entering from the back face side of the view angle-restricting sheet 1 will be explained. It is to be noted that, in FIG. 2, the rays of light L enter from the back face side of the protective layer 3 and exhibit a distribution with a peak in the front direction.

First, among the rays of light L, the rays of light $L_1$ entering substantially perpendicularly from the back face side of the protective layer 3 pass through the second light transmission section 5, and exit substantially perpendicularly from the front face side of the second light transmission section 5.

On the other hand, among the rays of light L, the rays of light $L_2$ entering from the back face side of the protective layer 3 at an angle θ with respect to the rays of light $L_1$ are diffused by the light-scattering surface provided at a boundary between the second light transmission section 5 and the first light transmission section 4, when entering the first light transmission section 4 from the second light transmission section 5. Further, the rays of light $L_2$' which are diffused light of the rays of light $L_2$ are diffused by the light-scattering surface provided at a boundary between the second light transmission section 5 and the first light transmission section 4, when exiting from the second light transmission section 5 toward the first light transmission section 4. Then, the rays of light $L_2$" which are diffused light of the rays of light $L_2$ exit from the front face side of the second light transmission section 5 at a predetermined angle with respect to the front direction, with the intensity of the rays of light $L_2$" being reduced as compared with the intensities of the rays of light $L_2$ and the rays of light $L_2$'.

Thus, with the aid of the view angle-restricting sheet 1, a sharp image can be displayed in the front direction using the rays of light not entering the first light transmission section 4 among the rays of light entering the second light transmission section 5 from the protective layer 3, and the leakage of the information from the oblique direction can be prevented by allowing the rays of light entering the first light transmission section 4 to exit after being suitably diffused.

Production Method

The method for producing the view angle-restricting sheet 1 is not particularly limited as long as a view angle-restricting sheet having the aforementioned structure can be produced, and various methods may be employed. An exemplary method for producing the view angle-restricting sheet 1 includes steps of: (1) obtaining a two-layer sheet element in which a layer that contains a material for forming the first light transmission section 4 and a layer that contains a material for forming the second light transmission section 5 are overlaid; (2) obtaining a multilayered structure by superposing a plurality of the two-layer sheet elements such that the layer that contains a material for forming the first light transmission section 4 and the layer that contains a material for forming the second light transmission section 5 are alternately arranged, and bonding the plurality of the two-layer sheet elements; (3) obtaining the optically functional layer 2 by cutting the obtained multilayered structure along the superposition direction; and (4) providing the protective layer 3 on the back face of the optically functional layer 2 by coating.

Moreover, (1) the step of obtaining a two-layer sheet element in which a layer that contains a material for forming the first light transmission section 4 and a layer that contains a material for forming the second light transmission section 5 are overlaid includes steps of: (a) providing the layer that contains a material for forming the second light transmission section 5 and matting the layer such that the surface of the layer has a predetermined surface roughness; and (b) overlaying the layer that contains a material for forming the first light transmission section 4 on the matted front face of the layer that contains a material for forming the second light transmission section 5, curing, and matting, and thereby providing a microstructure including fine protrusions on the front face of the layer that contains a material for forming the first light transmission section 4.

The view angle-restricting sheet 1 includes: the first light transmission sections 4; and the second light transmission sections 5 arranged between the first light transmission sections 4, and at least one lateral face of the lateral face of the first light transmission section 4 and the lateral face of the second light transmission section 5 that face each other is provided as a light-scattering surface; therefore, the rays of light entering from the back face side at a predetermined angle are allowed to exit after being diffused by the light-scattering surface. On the other hand, the view angle-restricting sheet 1 allows the rays of light entering from the back face side substantially perpendicularly to the first light transmission section 4 or the second light transmission section 5 to exit from the front face side of the optically functional layer 2 substantially perpendicularly. Therefore, the view angle-restricting sheet 1 can display a sharp image to a person seeing from the front direction (user), and can prevent the leakage of personal information and the like to a person seeing from the oblique direction by blurring the image displayed. The view angle-restricting sheet 1 prevents the leakage of personal information and the like by diffusing, on the light-scattering surface, rays of light entering from the back face side at a predetermined angle; therefore, a reduction in front face luminance can be inhibited.

According to the view angle-restricting sheet 1, when the haze value and the ratio ($T_2/W_2$) of the thickness ($T_2$) to the width ($W_2$) of the second light transmission section 5 fall within the respective ranges, the front face luminance can be improved using the rays of light entering the second light transmission section 5, and the view angle can be suitably adjusted.

According to the view angle-restricting sheet 1, since the lateral face of the first light transmission section 4 and the lateral face of the second light transmission section 5 are in close contact with each other, the sharpness of an image seen from the front direction and the degree of blurring of the image seen from the oblique direction may be suitably controlled.

According to the view single-restricting sheet 1, since the front face of the optically functional layer 2 is formed to be entirely flat, outgoing rays of light can be easily controlled. In addition, according to the view angle-restricting sheet 1, a constant thickness of the optically functional layer 2 can be maintained, and ease of use and optical uniformity thereof can be improved.

According to the view angle-restricting sheet 1, since the back face of the optically functional layer 2 is formed to be entirely flat, incident rays of light can be easily controlled. In addition, according to the view angle-restricting sheet 1, a constant thickness of the optically functional layer 2 can be maintained, and ease of use and optical uniformity can be improved.

Since the view angle-restricting sheet 1 includes the protective layer 3 provided on one face side of the optically functional layer 2, the strength, the shape stability and the like can be improved.

Second Embodiment

View Angle-Restricting Sheet 11

Figure 3:
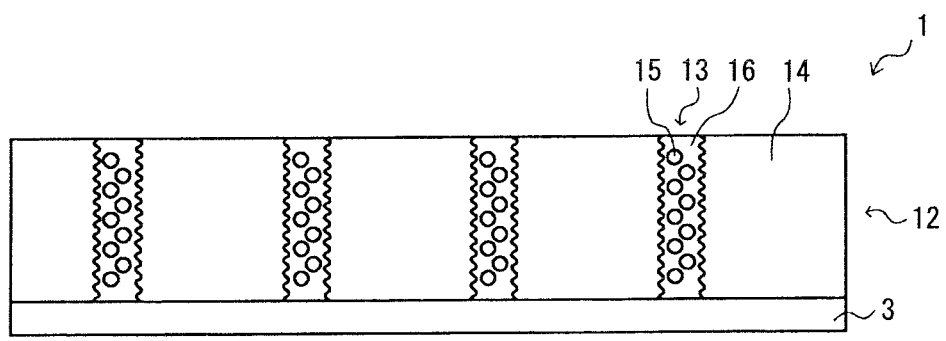
FIG. 3 is a schematic cross sectional view illustrating a view angle-restricting sheet according to an embodiment distinct from the view angle-restricting sheet shown in FIG. 1.

The view angle-restricting sheet 11 shown in FIG. 3 includes an optically functional layer 12 and a protective layer 3. Since the protective layer 3 in this embodiment is identical to that of the view angle-restricting sheet 1 shown in FIG. 1, explanation thereof will be omitted through designating the identical number.

Optically Functional Layer 12

The optically functional layer 12 includes: a plurality of first light transmission sections 13 that are rectangular in cross section and arranged in a multi-stripe fashion; and a plurality of second light transmission sections 14 that are rectangular in cross section and arranged in a multi-stripe fashion. In the optically functional layer 12, the first light transmission sections 13 are arranged substantially parallel to each other at intervals, and the second light transmission sections 14 are arranged between the first light transmission sections 13. The front face and the back face of the optically functional layer 12 are formed to be entirely flat. The optically functional layer 12 is configured such that a lateral face of the first light transmission section 13 and a lateral face of the second light transmission section 14 are in close contact with each other. The thickness of the optically functional layer 12 is similar to that of the thickness of the optically functional layer 2 shown in FIG. 1.

The surface area occupied by the first light transmission section 13 in the optically functional layer 12 is preferably no less than 5% and no greater than 40%. The upper limit of the surface area occupied by the first light transmission section 13 in the optically functional layer 12 is more preferably 30%, and still more preferably 20%. On the other hand, the lower limit of the surface area occupied by the first light transmission section 13 in the optically functional layer 12 is more preferably 10%, and still more preferably 15%. When the surface area occupied by the first light transmission section 13 is greater than the upper limit, a sharp image is highly unlikely to be able to be displayed to the person seeing from the front direction. To the contrary, when the surface area occupied by the first light transmission section 13 is less than the lower limit, the leakage of the personal information from the oblique direction is highly unlikely to be able to be suitably prevented.

First Light Transmission Section 13

The first light transmission section 13 includes a light diffusing agent 15 and a resin matrix 16. The light diffusing agent 15 is surrounded by the matrix 16. Although the synthetic resin for forming the matrix 16 is not particularly limited, examples thereof include synthetic resins similar to those exemplified as the principal component of the first light transmission section 4. A light-scattering surface similar to that of the first light transmission section 4 is provided on the first light transmission section 13.

The matrix 16 preferably contains a pigment in a dispersion state. The pigment contained in the matrix 16 in a dispersion state is not particularly limited, and exemplified by white pigments, black pigments, blue pigments, red pigments, and the like. Although the pigment contained in the matrix 16 in a dispersion state may be an inorganic pigment or an organic pigment, an inorganic pigment is suitably used in light of its superior light resistance and the like.

The white pigment is not particularly limited, and examples thereof include calcium carbonate, titanium oxide, zinc oxide, lead carbonate, barium sulfate, silicon oxide, aluminum oxide, and the like.

The black pigment is not particularly limited, and examples thereof include carbon black, black iron oxide, and the like.

The blue pigment is not particularly limited, and examples thereof include cobalt blue, ultramarine, Prussian, blue, turquoise blue, manganese blue, phthalocyanine blue, and the like.

The red pigment is not particularly limited, and examples thereof include colcothar (red iron oxide), cadmium red, molybdenum orange, and the like.

Although the mean particle size of the pigment is not particularly limited, the mean particle size of the pigment is preferably no less than 100 nm and no greater than 30 μm. The upper limit value of the mean particle size of the pigment is more preferably 3 μm, and still more preferably 1 μm. On the other hand, true lower limit value of the mean particle size of the pigment is more preferably 200 nm, and still more preferably 300 nm. When the mean particle size of the pigment is greater than the upper limit value, various characteristics and effects exhibited by the pigment may be deteriorated. To the contrary, when the mean particle size of the pigment is less than the lower limit value, the dispersibility of the pigment may be deteriorated. It is to be noted that the mean particle size used herein means an average of particle sizes of 30 particles randomly sampled from particles observed using an electron microscope at a magnification of ×1,000. In addition, the particle size is defined in terms of Feret's diameter (a distance between parallel lines along a specified direction when a projection is restricted between the parallel lines).

Although the content of the pigment with respect to the synthetic resin for forming the matrix 16 is not particularly limited, the content of the pigment is preferably no less than 5 parts by mass and no greater than 30 parts by mass. The upper limit value of the content of the pigment with respect to the synthetic resin is more preferably 25 parts by mass, and still more preferably 20 parts by mass. On the other hand, the lower limit value of the content of the pigment with respect to the synthetic resin is more preferably 7 parts by mass, and still more preferably 10 parts by mass. When the content of the pigment is greater than the upper limit value, the light diffusion effect exhibited by the first light transmission section 13 is highly likely to be impaired. To the contrary, the content of the pigment is less than the lower limit value, various characteristics and effects exhibited by the pigment may be deteriorated.

According to the view angle-restricting sheet 11, when the matrix 16 contains the pigment in a dispersion state, heat resistance, thermal dimensional stability, weather resistance, strength, as ability to prevent degradation over time, and the like of the first light transmission section 13 can be improved. In addition, according to the view angle-restricting sheet 11, when the matrix 16 contains the white pigment in a dispersion state, the rays of light directed toward the first light transmission section 13 from the second light transmission section 14 are enabled to be reflected on the second light transmission section 14. As a result, according to the view angle-restricting sheet 11, the luminance in the front direction can be improved. In addition, according to the view angle-restricting sheet 11, when the matrix 16 contains the black pigment in a dispersion state, the light absorptivity of the first light transmission section 13 can be enhanced. As a result, according to the view angle-restricting sheet 11, the rays of light entering the first light transmission section 13 can be absorbed to some extent, and the visibility from the oblique direction can be reduced.

Alternatively, the matrix 16 may contain fine particles having a high refractive index, such as, for example, ZnO, $TiO_2$, $CeO_2$, $SnO_2$, ITO, $Cs_{0.33}WO_3$, $Al_2O_3$, $La_2O_3$, $ZrO_2$ and $Y_2O_3$ for the purpose of increasing a refractive index. Although the mean particle size of the fine particles having a high refractive index is not particularly limited, the mean particle size of the fine particles having a high refractive index is preferably no less than 1 nm and no greater than 100 nm. The upper limit value of the mean particle size of the fine particles having a high refractive index is more preferably 80 nm, and still more preferably 60 nm. On the other hand, the lower limit value of the mean particle size of the fine particles having a high refractive index is more preferably 5 nm, and still more preferably 10 nm. When the mean particle size of the fine particles having a high refractive index is greater than the upper limit value, the transparency of the first light transmission section 13 may be deteriorated. To the contrary, when the mean particle size of the fine particles having a high refractive index is less than the lower limit value, the dispersibility of the fine particles having a high refractive index may be deteriorated.

Although the content of the fine particles having a high refractive index with respect to the synthetic resin for forming the matrix 16 is not particularly limited, the content of the fine particles having a high refractive index may be, for example, no less than 10% by mass and no greater than 60% by mass.

It is to be noted that additives similar to those for the first light transmission section 4 may be blended into the matrix 16.

The thickness ($T_1$) of the first light transmission section 13 may be identical to the thickness ($T_1$) of the first light transmission section 4. In addition, although the width ($W_1$) of the first light transmission section 13 is not particularly limited, the width ($W_1$) of the first light transmission section 13 is preferably no less than 3.5 μm and no greater than 100 μm. The upper limit value of the width ($W_1$) of the first light transmission section 13 is more preferably 75 μm, and still more preferably 50 μm. On the other hand, the lower limit value of the width ($W_1$) of the first light transmission section 13 is more preferably 5 μm, and still more preferably 7 μm. When the width ($W_1$) of the first light transmission section 13 is greater than the upper limit value, the amount of the rays of light diffused by the first light transmission section 13 may be increased and consequently the visibility of an image from the front direction is highly likely to be impaired. To the contrary, when the width ($W_1$) of the first light transmission section 13 is less than the lower limit value, the arithmetic mean roughness of the light-scattering surface of the first light transmission section 13 may be decreased, and consequently the rays of light is highly unlikely to be able to be suitably diffused.

Although the ratio ($T_1/W_1$) of the thickness ($T_1$) to the width ($W_1$) of the first light transmission section 13 is not particularly limited, the ratio ($T_1/W_1$) of the thickness ($T_1$) to the width ($W_1$) of the first light transmission section 13 is preferably no less than 4 and no greater than 40. The upper limit of the ratio ($T_1/W_1$) of the thickness ($T_1$) to the width ($W_1$) of the first light transmission section 13 is more preferably 35, and still more preferably 30. On the other hand, the lower limit of the ratio ($T_1/W_1$) of the thickness ($T_1$) to the width ($W_1$) of the first light transmission section 13 is more preferably 7, and still more preferably 10. When the ratio ($T_1/W_1$) of the thickness ($T_1$) to the width ($W_1$) of the first light transmission section 13 does not fail within the above range, a sharp image is highly unlikely to be able to be displayed to the person seeing from the front direction.

Although the distance between the first light transmission sections 13 arranged is not particularly limited, the distance between the first light transmission sections 13 is preferably no less than 6 μm and no greater than 400 μm. The upper limit value of the distance between the first light transmission sections 13 is more preferably 300 μm, and still more preferably 200 μm. On the other hand, the lower limit value of the distance between the first light transmission sections 13 is more preferably 50 μm, and still more preferably 100 μm. When the distance between the first light transmission sections 13 is greater than the upper limit value, the leakage of the personal information from the oblique direction is highly unlikely to be able to be suitably prevented. To the contrary, when the distance between the first light transmission sections 13 is less than the lower limit, a sharp image is highly unlikely to be able to be displayed to the person seeing from the front direction.

Although the refractive index ($n_5$) of the matrix 16 is not particularly limited, the refractive index ($n_5$) of the matrix 16 is preferably greater than the refractive index ($n_2$) of the second light transmission section 14. Thus, the rays of light entering the first light transmission section 13 from the second light transmission section 14 can be suitably prevented from exiting as rays of light having a peak along a direction comparatively close to the front direction, and hence the sharpness of an image displayed to the person seeing from the front direction can be improved. Moreover, in this case, the refractive index ($n_5$) of the matrix 16 is preferably no less than 1.57, more preferably no less than 1.6, and still more preferably no less than 1.63. In addition, although the difference between the refractive index ($n_5$) of the matrix 15 and the refractive index ($n_2$) of the second light transmission section 14 ($n_5-n_2$) is not particularly limited, the difference between the refractive index ($n_5$) of the matrix 15 and the refractive index ($n_2$) of the second light transmission section 14 ($n_5-n_2$) is preferably no less than 0.15, more preferably no less than 0.3, and still more preferably no less than 0.45.

The light diffusing agent 15 is contained in the first light transmission section 13 substantially at uniform density. The light diffusing agent 15 is particles that have a property of diffusing rays of light, and is divided broadly into inorganic fillers and organic fillers. As an inorganic filler, silica, aluminum hydroxide, aluminum oxide, zinc oxide, barium, sulfide, magnesium silicate, or a mixture thereof may be used, for example. As a material for organic fillers, an acrylic resin, an acrylonitrile resin, a polyolefin resin, polyurethane, polyvinyl chloride, polystyrene, polyacrylonitrile, polyamide and the like may be used, for example. Among these, an acrylic resin is preferred in light of superior transparency, and polymethylmethacrylate (PMMA) is particularly preferred.

The shape of the light diffusing agent 15 is not particularly limited, and examples thereof include a spherical shape, a spindle shape, a needle-like shape, a rod-like shape, a cubic shape, a platy shape, a flaky shape, a fiber-like shape, and the like; among these, spherical beads that are superior in light-diffusing ability are preferred.

Although the mean particle size of the light diffusing agent 15 is not particularly limited, the mean particle size of the light diffusing agent 15 is preferably no less than 1 μm and no greater than 50 μm. The upper limit value of the mean particle size of the light diffusing agent 15 is more preferably 20 μm, and still more preferably 15 μm. On the other hand, the lower limit value of the mean particle size of the light diffusing agent 15 is more preferably 2 μm, and still more preferably 5 μm. When the mean particle size of the light diffusing agent 15 is greater than the upper limit value, the width of the first light transmission section 13 may be increased. To the contrary, when the mean particle size of the light diffusing agent 15 is less than the lower limit value, the dispersibility of the light diffusing agent 15 may be deteriorated.

Although the mass ratio the light diffusing agent 15 to the matrix 15 is not particularly limited, the mass ratio the light diffusing agent 15 to the matrix 16 is preferably no less than 0.1 and no greater than 2. The upper limit of the mass ratio the light diffusing agent 15 to the matrix 16 is more preferably 1, and still more preferably 0.5. On the other hand, the lower limit of the mass ratio the light diffusing agent 15 to the matrix 16 is more preferably 0.2, and still more preferably 0.3. When the mass ratio the light diffusing agent 15 to the matrix 16 is greater than the upper limit, the effect of fixing the light diffusing agent 15 may be deteriorated. To the contrary, when the mass ratio the light diffusing agent 15 to the matrix 16 is less than the lower limit, the light-diffusing ability may be insufficient.

Although the absolute value of a difference between the refractive index ($n_5$) of the matrix 16 said the refractive index ($n_3$) of the light diffusing agent 15 ($|n_5-n_3|$) is not particularly limited, the absolute value of the difference between the refractive index ($n_5$) of the matrix 16 and the refractive index ($n_3$) of the light diffusing agent 15 ($|n_5-n_3|$) is preferably no less than 0.03, more preferably no less than 0.06, and still preferably no less than 0.09. When the absolute value of the difference between the refractive index ($n_5$) of the matrix 16 and the refractive index ($n_3$) of the light diffusing agent 15 ($|n_5-n_3|$) is less than the lower limit, the rays of light entering the first light transmission section 13 may not be able to be suitably diffused at a boundary between the matrix 16 and the light diffusing agent 15.

In addition, the refractive index ($n_5$) of the matrix 16 is preferably greater than the refractive index ($n_3$) of the light diffusing agent 15. According to the view angle-restricting sheet 11, when the refractive index ($n_5$) of the matrix 16 is greater than the refractive index ($n_3$) of the light diffusing agent 15, rays of light can be suitably diffused at a boundary between the matrix 16 and the light diffusing agent 15.

Although the haze value of the first light transmission section 13 is not particularly limited, the haze value of the first light transmission section 13 is preferably no less than 30%, more preferably no less than 40%, and still more preferably no less than 50%. When the haze value of the first light transmission section 13 is less than the lower limit, the light diffusion function is highly likely to be impaired.

Second Light Transmission Section 14

The second light transmission section 14 contains a transparent, in particular, colorless and transparent, synthetic resin as a principal component, since the second light transmission section 14 needs to transmit rays of light. Although the synthetic resin as a principal component of the second light transmission section 14 is not particularly limited, examples thereof include synthetic resins similar to those used as the principal component of the second light transmission section 5. Additives which may be added to the second light transmission section 14 may be identical to those which may be added into the second light transmission section 5.

In addition, the second light transmission section 14 is provided with a light-scattering surface, similarly to the second light transmission section 5. The thickness ($T_2$), the ratio ($T_2/W_2$) of the thickness ($T_2$) to the width ($W_2$) and the haze value of the second light transmission section 14 may be identical to those of the second light transmission section 5.

Although the ratio ($W_2/W_1$) of the width ($W_2$) of the second light transmission section 14 to the width ($W_1$) of the first light transmission section 13 is not particularly limited, the ratio ($W_2/W_1$) of the width ($W_2$) of the second light transmission section 14 to the width ($W_1$) of the first light transmission section 13 is preferably no less than 1.5 and no greater than 15. The upper limit of the ratio ($W_2W_1$) of the width ($W_2$) of the second light transmission section 14 to the width ($W_1$) of the first light transmission section 13 is more preferably 12, and still more preferably 10. On the other hand, the lower limit of the ratio ($W_2/W_1$) of the width ($W_2$) of the second light transmission section 14 to the width ($W_1$) of the first light transmission section 13 is more preferably 3, and still more preferably 5. When the ratio ($W_2/W_1$) of the width ($W_2$) of the second light transmission section 14 to the width ($W_1$) of the first light transmission section 13 is greater than the upper limit, the view angle may be excessively increased. To the contrary, when the ratio ($W_2/W_1$) of the width ($W_2$) of the second light transmission section 14 to the width ($W_1$) of the first light transmission section 13 is less than the lower limit, the sharpness of an image is highly likely to be impaired by the rays of light diffused by the light-scattering surface when the image is seen from the front direction.

Production Method

The method for producing the view angle-restricting sheet 11 is not particularly limited as long as a view angle-restricting sheet having the aforementioned structure can be produced, and examples thereof include methods similar to those for the view angle-restricting sheet 1.

According to the view angle-restricting sheet 11, since the first light transmission section 13 includes the light diffusing agent 15 and the resin matrix 16, the light-diffusing ability imparted by the first light transmission section 13 can be remarkably improved, and, in turn, the sharpness of an image displayed to the person seeing from the front direction can be improved and the leakage of the personal information from the oblique direction can be suitably prevented.

Third Embodiment

Touchscreen 21

The touchscreen 21 shown in FIG. 4 includes a substrate 22, a transparent electrically conductive layer 23, a tacky layer 24, a substrate 25, and a view angle-restricting sheet 1. In this embodiment, the view angle-restricting sheet 1 is identical to the view angle-restricting sheet 1 shown in FIG. 1, and therefore explanation thereof will be omitted through designating the identical number. The touchscreen 21 is provided on the front face side of the display panel (not shown in the Figure). The touchscreen 21 allows an image light emitted from the display panel to exit toward the front face side. The touchscreen 21 is provided as a capacitive touchscreen.

The substrate 22 is made from a transparent insulating material. Specifically, the substrate 22 is provided as a glass substrate. The transparent electrically conductive layer 23 is made from an electrically conductive material having transparency and electric conductivity. The material for forming the transparent electrically conductive layer 23 is exemplified by an inorganic metal and an organic electrically conductive polymer. Examples of the inorganic metal include gold, silver, copper, platinum, nickel, tin oxide and indium tin oxide (ITO). Examples of the organic electrically conductive polymer include organic electric conductivity compositions containing polyaniline, polythiophene, polypyrrole, polyquinoxaline, and the like. Among these, ITO or a polythiophene-based material are preferred in light of favorable optical characteristics, appearance and electric conductivity. The tacky layer 24 bonds the transparent electrically conductive layer 23 and the substrate 25. Although the material for forming tacky layer 24 is not particularly limited, examples thereof include well-known tacky resins such as acrylic resins and urethane resins. The substrate 25 is a transparent insulating substrate and is provided as a glass substrate similarly to the substrate 22. The view angle-restricting sheet 1 is overlaid on the back face of the substrate 25. The view angle-restricting sheet 1 is overlaid on the back face of the substrate 25 via a tacky layer (not shown in the Figure). The view angle-restricting sheet 1 is arranged such that the longitudinal direction of the first light transmission section 4 is parallel to the vertical direction of the touchscreen 21.

Since the view angle-restricting sheet 1 is provided on the front face side of the display panel, a sharp image can be displayed to the person seeing from the front direction, and the leakage of personal information and the like through glimmering from an oblique direction can be suitably prevented.

The touchscreen 21 enables the rays of light entering from the back face side of the view angle-restricting sheet 1 at a predetermined angle to exit after being diffused by the light-scattering surface. On the other hand, the touchscreen 21 allows the rays of light entering from the back face side of the view angle-restricting sheet 1 substantially perpendicularly to the first light transmission section 4 or the second light transmission section 5 to exit from the front face side of the optically functional layer 2 substantially perpendicularly. Therefore, the touchscreen 21 can display a sharp image to a person seeing from the front direction (user), and can prevent the leakage of personal information and the like to a person seeing from the oblique direction by blurring the image displayed.

Fourth Embodiment

Touchscreen 31

Figure 5:
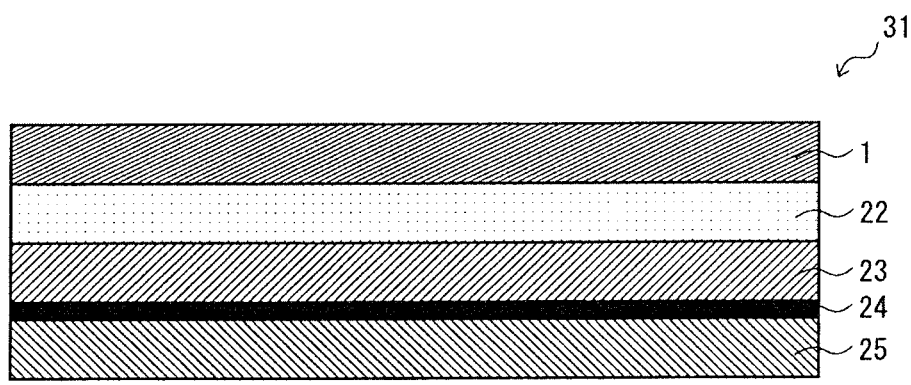
FIG. 5 is a schematic cross sectional view illustrating a touchscreen according to an embodiment distinct from the touchscreen shown in FIG. 4.

The touchscreen 31 shown in FIG. 5 includes a view angle-restricting sheet 1, a substrate 22, a transparent electrically conductive layer 23, a tacky layer 24, and a substrate 25. In this embodiment, the view angle-restricting sheet 1 is identical to the view angle-restricting sheet 1 shown in FIG. 1, and the substrate 22, the transparent electrically conductive layer 23, the tacky layer 24 and the substrate 25 are identical to those of the touchscreen 21 shown in FIG. 4; therefore, explanation thereof will be omitted through designating the identical number. The touchscreen 31 is provided on the front face side of the display panel (not shown in the Figure). The touchscreen 31 allows an image light emitted from the display panel to exit toward the front face side. The touchscreen 31 is provided as a capacitive touchscreen. The view angle-restricting sheet 1 is arranged such that the longitudinal direction of the first light transmission section 4 is parallel to the vertical direction of the touchscreen 41.

Since the view angle-restricting sheet 1 is provided on the front face side of the display panel, a sharp image can be displayed to the person seeing from the front direction, and the leakage of personal information and the like through glimmering from the oblique direction can be suitably prevented.

The touchscreen 31 enables the rays of light entering from the back face side of the view angle-restricting sheet 1 at a predetermined angle to exit after being diffused by the light-scattering surface. On the other hand, the touchscreen 31 allows the rays of light entering from the back face side of the view angle-rest rioting sheet 1 substantially perpendicularly to the first light transmission section 4 or the second light transmission section 5 to exit from the front face side of the optically functional layer 2 substantially perpendicularly. Therefore, the touchscreen 31 can display a sharp image to a person seeing from the front direction (user), and can prevent the leakage of personal information and the like to a person seeing from the oblique direction by blurring the image displayed.

Other Embodiments

It is to be noted that the view angle-restricting sheet according to the embodiment of the present invention and the flat panel display that includes the view angle-restricting sheet may be carried out in various modified or improved embodiments, in addition to the embodiments described above.

For example, the view angle-restricting sheet may not include the protective layer, or alter natively the protective layer may be provided on the front face side of the optically functional layer, or the protective layer may be provided on both front and back faces of the optically functional layer.

According to the view angle-restricting sheet, the second light transmission section may not necessarily contain a synthetic resin. According to the view angle-restricting sheet, the second light transmission section may be a hallow section containing air. In addition, according to the view angle-restricting sheet, the lateral face of the first light transmission section and the lateral face of the second light transmission section may not in close contact with each other. According to the view angle-restricting sheet, even when a gap exists between the lateral face of the first light transmission section and the lateral face of the second light transmission section, rays of light can be refracted at a boundary between the lateral face of the first light transmission section and the gap as well as a boundary between the lateral face of the second light transmission section and the gap, and hence the diffusing ability can be improved.

According to the view angle-restricting sheet, the front face and/or the back face of the optically functional layer may not be entirely flat. According to the view angle-restricting sheet, visibility, a view single and the like from the front direction can be adjusted, for example, by changing the thickness of the first light transmission section and the thickness of the second light transmission section. According to the view angle-restricting sheet, other layer(s) may be overlaid between the protective layer and the optically functional layer. According to the view angle-restricting sheet, the first light transmission sections may not necessarily be arranged at regular intervals.

According to the view angle-restricting sheet, both of the lateral face of the first light transmission section and the lateral face of the second light transmission section that face each other may not necessarily be provided as a light-scattering surface, and only either lateral face may be provided as a light-scattering surface. In addition, according to the view angle-restricting sheet, the microstructure including fine protrusions may not be provided on the entire lateral faces of the first light transmission section and the second light transmission section.

The view angle-restricting sheet may include a view angle controlling plate that is provided crosswise with respect to the first light transmission section and the second light transmission section. When the view angle-restricting sheet includes such a view angle controlling plate, the possibility that personal information leaks from the oblique direction can be remarkably decreased.

The view angle-restricting sheet can be provided on various types of touchscreens other than the capacitive touchscreen, such as resistive touchscreens and electromagnetic inductive touchscreens. Even in a case where the view angle-restricting sheet, is provided on the touchscreen, the view angle-restricting sheet may not necessarily be provided such that the longitudinal direction of the first light transmission section and the vertical direction of the touchscreen are parallel to each other. The view angle-restricting sheet may not necessarily be used on a touchscreen, and may be provided on the front face side of a display panel of various flat panel displays such as liquid crystal displays, plasma displays and organic EL displays.

EXAMPLE

Hereinafter, the present invention will be explained in more detail by way of Examples, but the present invention should not in any way be construed to be limited by Examples.

Example 1

An acrylic resin was fed to a T die, and then subjected to extrusion molding to form an extruded article in a sheet form for forming a second light transmission section. Further, both faces of the extruded article were matted such that a surface roughness, (Ra) and (Rz), specified in Table 1 was attained. Separately, a coating liquid that contained a polyfunctional urethane (meth)acrylate and tin-containing indium oxide particles (ITO) (average primary particle size: 30 nm) (polyfunctional urethane (meth)acrylate/tin-containing indium oxide particle of 9/41) was prepared, then coated on the front face of the extruded article, dried at 80° C., and irradiated with an ultraviolet ray to allow curing thereof. Further, the surface of the coated layer was matted, and thereby a laminate that included a first light transmission section and a second light transmission section was formed. Next, laminates having a structure identical to that of the laminate formed above were overlaid and bonded sequentially to form a multilayered article in which the first light transmission sections and the second light transmission sections were sequentially overlaid. Then, the multilayered article was cut at a predetermined interval along the perpendicular direction, and on one cutting plane (back face side), a protective layer that contained a material identical to that of the second light transmission section and had an average thickness of 5 μm was overlaid to obtain a view angle-restricting sheet according to Example 1.

Examples 2 to 8

View angle-restricting sheets according to Examples 2 to 8 were obtained in a similar manner to Example 1 except that the ratio ($T_1/W_1$) of the thickness ($T_1$) to the width ($W_1$) and the ratio ($T_2/W_2$) of the thickness ($T_2$) to the width ($W_2$) shown in Table 1 were attained.

Example 9

An acrylic resin was fed to a T die, and then subjected to extrusion molding to form an extruded article in a sheet form for forming a second light transmission section. Further, both faces of the extruded article were matted such that a surface roughness, (Ra) and (Rz), specified in Table 1 was attained. Separately, a coating liquid that contained a material for forming a matrix that contained a polyfunctional urethane (meth)acrylate and tin-containing indium oxide particles (ITO) (average primary particle size: 30 nm), as well as a light diffusing agent (acrylic resin beads (mean particle diameter: 3 μm)) contained in a mass ratio of 0.5 with respect to the material for forming a matrix were prepared, then coated on the front face of the extruded article, dried at 80° C., and irradiated with a ultraviolet ray to allow curing thereof. Further, the surface of the coated layer was matted, and thereby a laminate that included a first light transmission section and a second light transmission section was formed. Next, laminates having a structure identical to that of the laminate formed above were overlaid and bonded sequentially to form a multilayered article in which the first light transmission sections and the second light transmission sections were sequentially overlaid. Then, the multilayered article was cut at a predetermined interval along the perpendicular direction, and on one cutting plane (back face side), a protective layer that contained a material identical to that of the second light transmission section and had an average thickness of 5 μm was overlaid to obtain a view angle-restricting sheet according to Example 9.

View angle-restricting sheets according to Examples 10 to 16 were obtained in a similar manner to Example 9 except that the ratio ($T_1/W_1$) of the thickness ($T_1$) to the width ($W_1$) and the ratio ($T_2/W_2$) of the thickness ($T_2$) to the width ($W_2$) shown in Table 1 were attained.

Comparative Example 1

An acrylic resin was fed to a T die, and then subjected to extrusion molding to form an extruded article for forming a second light transmission section. Further, both faces of the extruded article were matted such that a surface roughness, (Ra) and (Rz), specified in Table 1 was attained. Separately, a coating liquid that contained a poly functional urethane (meth)acrylate and a black pigment (carbon black) as a light absorbing material contained in an amount of 35 parts by mass with respect to 100 parts by mass of the polyfunctional urethane (meth)acrylate was prepared, then coated on the front face of the extruded article, dried 80° C., and irradiated with an ultraviolet ray to allow curing thereof. Further, the surface of the coated layer was matted, and thereby a laminate that included a first light transmission section and a second light transmission section was formed. Next, laminates having a structure identical to that of the laminate formed above were overlaid and bonded sequentially to form a multilayered article in which the first light transmission sections and the second light transmission sections were sequentially overlaid. Then, the multilayered article was cut at a predetermined interval along the perpendicular direction, and on one cutting plane (back face side), a protective layer that contained a material identical to that of the second light transmission section and had an average thickness of 5 nm was overlaid to obtain a view angle-restricting sheet according to Comparative Example 1.

(a) "A" in a case where the displayed image could not be discriminated;

(b) "B" in a case where the displayed image could be hardly discriminated;

(c) "C" in a case where the displayed image could be vaguely discriminated; and (d) "D" in a case where the displayed image could be clearly discriminated.

The results are shown in Table 1.

The evaluation of the luminance characteristic was made as follows based on the visibility of the displayed image in visual inspection from the front direction (0°±5°) when a backlight was turned on:

(a) "A" in a case where a reduction in luminance was hot found, and an linage displayed on a display screen was seen sharply;

(b) "B" in a case where a reduction in luminance was hot found, but an image displayed on a display screen was seen accompanied by somewhat blurring; and (c) "C" in a case where a reduction in luminance was found.

The results are shown in Table 1.

TABLE 1

| | Optically functional layer | | | | | | | | | |
|---|---|---|---|---|---|---|---|---|---|---|
| | first light transmission section | | | | | second light transmission section | | boundary between first light transmission section and second light transmission section | | View angle characteristic | Luminance characteristic |
| | average thickness ($\mu$m) | ratio ($T_1/W_1$) of thickness ($T_1$) to width ($W_1$) | refractive index ($n_1$) | refractive index of matrix ($n_5$) | refractive index of light diffusing agent ($n_3$) | ratio ($T_2/W_2$) of thickness ($T_2$) to width ($W_2$) | refractive index ($n_2$) | arithmetic mean roughness (Ra) ($\mu$m) | ten-point mean roughness (Rz) ($\mu$m) | | |
| Example 1 | 150 | 20 | 1.68 | — | — | 1 | 1.49 | 3 | 10 | C | A |
| Example 2 | 150 | 20 | 1.68 | — | — | 2 | 1.49 | 3 | 10 | B | A |
| Example 3 | 150 | 20 | 1.63 | — | — | 4 | 1.49 | 3 | 10 | B | A |
| Example 4 | 150 | 20 | 1.68 | — | — | 9 | 1.49 | 3 | 10 | B | B |
| Example 5 | 150 | 3 | 1.68 | — | — | 3 | 1.49 | 3 | 10 | B | B |
| Example 6 | 150 | 10 | 1.68 | — | — | 3 | 1.49 | 3 | 10 | B | A |
| Example 7 | 150 | 30 | 1.68 | — | — | 3 | 1.49 | 3 | 10 | B | A |
| Example 8 | 150 | 42 | 1.68 | — | — | 3 | 1.49 | 3 | 10 | C | A |
| Example 9 | 150 | 20 | — | 1.68 | 1.49 | 1 | 1.49 | 3 | 10 | B | A |
| Example 10 | 150 | 20 | — | 1.68 | 1.49 | 2 | 1.49 | 3 | 10 | A | A |
| Example 11 | 150 | 20 | — | 1.68 | 1.49 | 4 | 1.49 | 3 | 10 | A | A |
| Example 12 | 150 | 20 | — | 1.68 | 1.49 | 9 | 1.49 | 3 | 10 | A | B |
| Example 13 | 150 | 3 | — | 1.68 | 1.49 | 3 | 1.49 | 3 | 10 | A | B |
| Example 14 | 150 | 10 | — | 1.68 | 1.49 | 3 | 1.49 | 3 | 10 | A | A |
| Example 15 | 150 | 30 | — | 1.68 | 1.49 | 3 | 1.49 | 3 | 10 | A | A |
| Example 16 | 150 | 42 | — | 1.68 | 1.49 | 3 | 1.49 | 3 | 10 | B | A |
| Comparative Example 1 | 150 | 20 | — | — | — | 3 | 1.49 | 3 | 10 | A | C |
| Comparative Example 2 | — | — | — | — | — | — | — | — | — | D | A |

Evaluations of Characteristics view angle-restricting sheets according Examples 1 to 16 and Comparative Example 1 were each overlaid on the front face of a substrate of a touchscreen, and a view angle characteristic and a luminance characteristic were evaluated. In addition, as Comparative Example 2, the view angle characteristic and the luminance characteristic in the case of not using any view angle-restricting sheet were evaluated.

The evaluation of the view angle characteristic was made as follows based on the visibility of the displayed image in visual inspection from the oblique direction (0°±45°) when a backlight was turned on:

As shown in Table 1 set forth above when the view angle-restricting sheets according to Examples 1 to 16 were used, the requirement of the view angle characteristic was satisfied and a superior luminance characteristic was also exhibited, as compared with those according to Comparative Examples 1 and 2.

INDUSTRIAL APPLICABILITY

As set forth above, the view angle-restricting sheet according to the present invention and the flat panel display that includes the view angle-restricting sheet enable the leakage of personal information and the like through glimmering from an oblique direction to be suitably prevented and a reduction in front face luminance to be inhibited; and therefore, these can be suitably used for various flat panel displays such as liquid crystal displays, plasma displays and organic EL displays.

EXPLANATION OF THE REFERENCE SYMBOLS 1 view angle-restricting sheet
2 optically functional layer
3 protective layer
4 first light transmission section
5 second light transmission section
11 view angle-restricting sheet
12 optically functional layer
13 first light transmission section
14 second light transmission section
15 light diffusing agent
16 matrix
21 touchscreen
22 substrate
23 transparent electrically conductive layer
24 tacky material
25 substrate
31 touchscreen

The invention claimed is:

1. A view angle-restricting sheet, comprising an optically functional layer which comprises:
   a plurality of first light transmission sections that are rectangular in cross section and arranged in a multi-stripe fashion; and
   at least one second light transmission section that is/are rectangular in cross section and arranged between the first light transmission sections, wherein,
   a lateral face of the first light transmission section and a lateral face of the second light transmission section are in close contact with each other,
   the first light transmission section comprises a transparent light diffusing agent and a resin matrix comprising a colorless transparent synthetic resin as a principal component, and
   a lateral face of the first light transmission section, and a lateral face of the second light transmission section that face each other are provided as a light-scattering surface having a microstructure comprising fine protrusions allowing for transmission and diffusion of light.

2. The view angle-restricting sheet according to claim 1, wherein an arithmetic mean roughness (Ra) of the light-scattering surface is no less than 1.5 μm and no greater than 4 μm.

3. The view angle-restricting sheet according to claim 1, wherein a ratio (Rz/Ra) of a ten-point mean roughness (Rz) to an arithmetic mean roughness (Ra) of the light-scattering surface is no less than 1 and no greater than 20.

4. The view angle-restricting sheet according to claim 1, wherein no less than 2 pieces/ mm and no greater than 100 pieces/ mm of the light-scattering surface are provided per unit length along a perpendicular direction of the light-scattering surface.

5. The view angle-restricting sheet according to claim 1, wherein a hase value of the second light transmission section is no greater than 20%, and a ratio $(T_2/W_2)$ of a thickness $(T_2)$ to a width $(W_2)$ of the second light transmission section is no less than 1 and no greater than 8.5.

6. The view angle-restricting sleet according to claim 1, wherein a ratio $(W_2/W_1)$ of a width $(W_2)$ of the second light transmission section to a width $(W_1)$ of the first light transmission section is no less than 1.5 and no greater than 15.

7. The view angle-restricting sheet according to claim 1, wherein a ratio $(T_1/W_1)$ of a thickness $(T_1)$ to the width $(W_1)$ of the first light transmission section is no less than 4 and no greater than 40.

8. The view angle-restricting sheet according to claim 1, wherein a distance between the first light transmission sections arranged is no less than 6 μm and no greater than 400 μm.

9. The view angle-restricting sheet according to claim 1, wherein a refractive index $(n_5)$ of the resin matrix of the first light transmission section is greater than the refractive index $(n_2)$ of the second light transmission section.

10. The view angle-restricting sheet according to claim 1, wherein a front face of the optically functional layer is entirely flat.

11. The view angle-restricting sheet according to claim 1, wherein a back face of the optically functional layer is entirely flat.

12. The view angle-restricting sheet according to claim 1, further comprising a protective layer provided on one face side of the optically functional layer.

13. The view angle-restricting sheet according to claim 1, which is provided on a front face side of a display panel of a flat panel display.

14. A flat panel display comprising the view angle-restricting sheet according to claim 13.

* * * * *